United States Patent [19]

Dennis

[11] Patent Number: 4,847,318

[45] Date of Patent: Jul. 11, 1989

[54] GELLED ORGANIC LIQUID AND METHOD FOR MAKING

[75] Inventor: Kent S. Dennis, Midland, Mich.

[73] Assignee: The Dow Chemical Company, Midland, Mich.

[21] Appl. No.: 146,940

[22] Filed: Jan. 22, 1988

Related U.S. Application Data

[63] Continuation-in-part of Ser. No. 43,385, Apr. 28, 1987, abandoned, and a continuation-in-part of Ser. No. 43,386, Apr. 28, 1987, abandoned.

[51] Int. Cl.$^4$ .............................................. C08L 39/00
[52] U.S. Cl. .................................... 524/516; 525/88; 525/89; 526/310
[58] Field of Search .................... 524/516; 525/88, 89; 526/310

[56] References Cited

U.S. PATENT DOCUMENTS 3,642,728  2/1972  Canter ................................. 525/341
4,520,158  5/1985  Peiffer ................................. 524/107

*Primary Examiner*—Joseph L. Schofer
*Assistant Examiner*—Peter D. Mulcahy
*Attorney, Agent, or Firm*—Thomas D. Zindrick; Bruce M. Kanuch

[57] ABSTRACT

An effective method for gelling certain organic liquids. The invention, in one embodiment, comprises forming a solution of the organic liquids and an amount of a triblock copolymer of relatively moderate molecular weight, having poly(4-vinylpyridene) end blocks and a small amount of a salt of a transition metal. In another embodiment, the invention comprises forming a solution of the organic liquids and an amount of a triblock copolymer of relatively moderate molecular weight, having poly(4-vinylpyridene) end blocks and a small amount of an acid. Such gelled liquids are useful as pipe line pigs, in automobile lacquers and in charcoal lighter fluids.

57 Claims, No Drawings

GELLED ORGANIC LIQUID AND METHOD FOR MAKING

This application is a continuation in part of copending applications Ser. No. 043,385, filed Apr. 28, 1987, now abandoned and Ser. No. 043,386, filed Apr. 28, 1987 now abandoned.

BACKGROUND OF THE INVENTION

The present invention relates to the gelation or viscosification of organic liquids. More specifically, this invention relates to the gelation of organic liquids using ABA triblock polymers.

There are quite diverse applications for thickened or gelled solutions of polymers in organic liquids, potential applications for this process and the products derived therefrom will be evident in the instant application. Of particular interest, are the applications of the gelled organic liquids as pipe line pigs, automotive lacquers, and charcoal lighter fluids.

There are a number of physical and chemical techniques for preparing such systems. A formation of such gels, however, has usually required difficult compounding conditions. The gelling of organic liquids is normally achieved by the addition of moderate amounts of high molecular weight polymers. The degree of gelation is dependent on the level of polymer additive as well as the polymer molecular weight. As a consequence, the achievement of high viscosity via this approach requires either very high levels of additive or extremely high molecular weights of the additive component. High levels of additive are often uneconomical and they undesirably increase the viscosity and substantially decrease the number of uses for the liquid; the use of very high molecular weight additives gives rise to shear degradation which means that viscosities obtained are often unstable.

Accordingly, an object of this invention is to provide improved gelled organic compositions, which do not have the process limitations of compositions containing high molecular weight additives.

A further object of this invention is to provide a method for economically producing gelled organic compositions from readily available materials.

Other aspects, objects, as well as the several advantages of this invention will be apparent to those skilled in art upon reading the specification and the appended claims.

SUMMARY OF THE INVENTION

These benefits and other advantages are achieved in accordance with the present invention. In one embodiment, the present invention takes the form of a method for the gelation of organic liquids comprising: (a) providing an organic liquid having a solubility parameter in the range of between about 7.5 to about 10.5; (b) contacting the organic liquid with one or more types of ABA block polymer of moderate molecular weight, wherein the A block is 4-vinylpyridine and B block comprises a polymer having a solubility parameter such that each ABA block polymer dissolves in the organic liquid; and (c) contacting the organic liquid with at least one gelation agent in an amount effective to cause visible gelation of the organic liquid, said gelation agent being a transition metal salt or an acid.

In another embodiment, the invention takes the form of a composition comprising a gelled organic liquid which comprises (a) an organic liquid having a solubility parameter in the range of between about 7.5 to about 10.5; (b) one or more types of ABA block polymer of moderate molecular weight, wherein the A block is 4-vinylpyridine and B block comprises a polymer having a solubility parameter such that each ABA block polymer dissolves in the organic liquid; and (c) at least one gelation agent in an amount sufficient to form a visible gel, said gelation agent being a transition metal salt or an acid.

DETAILED DESCRIPTION OF THE INVENTION

It has been found that, surprisingly, an organic liquid having a solubility parameter between about 7.5 to about 10.5 may be gelled by adding thereto at least one type of triblock polymer of moderate molecular weight and a minor portion of at least one gelation agent. The gelation agent is a metal cation salt or an acid.

The gelled composition of the present invention is made up by preparing a solution of one or more types of ABA block polymer in an organic liquid. A soluble salt of a transition metal is also added to the organic liquid in an amount sufficient to cause visible gelation of the liquid. The gel state can be distinguished from the state of a macromolecular solution with critical or supercritical concentration by the fact that the polymer coils no longer move as units and can no longer interchange their places.

Generally, organic liquids with solubility parameters in the range from about 7.5 up to about 10.5 can be gelled. "Solubility parameter" (s.p.) governs the heat of mixing of liquids and amorphous polymers. Methods of calculating solubility parameters of solvents from physical constants and of polymers from experimental determinations are well-known to those skilled in the art. A general description of methods suitable for obtaining solubility parameters for solvents and polymers, and a compilation of solubility parameters for selected solvents and polymers is is set forth in the *Polymer Handbook*, 2nd edition, (1975) p. IV-(337-359).

Of the suitable organic liquids, those which are most highly polar demonstrate superior gelation. For the purposes of this invention, organic liquids which can be gelled are hydrocarbons including aliphatic (e.g., nonane and the like) or aromatic (e.g., ethylbenzene and the like); chlorinated solvents (e.g., methylchloroform and o-dichlorobenzene and the like ); ketones (e.g., methyl i-butyl ketone and the like); esters (e.g., ethyl benzoate and the like); and ethers (e.g., glyme and tetrahydrofuran and the like). Because of their relatively high solubility parameters, ethyl benzoate and o-dichlorobenzene are particularly gellable.

According to the present invention, organic liquids can be gelled with relatively minor amounts of at least one type of ABA triblock polymer having relatively low molecular weight. The total amount of triblock polymer added to the organic liquid is generally from about 0.5 to about 5 weight percent, based on the resultant gelled solution. Preferably, the total amount of triblock polymer comprises about 1 to about 2 weight percent of the gelled solution. further, each triblock polymer employed should have a molecular weight of between about 200,000 to about 800,000. For the purpose of the present invention, "molecular weight" shall mean number average molecular weight ($M_n$). Methods for determining number-average molecular weight are well-known to those in the art.

The order in which each triblock polymer and gelation agent employed are added to the organic liquid to form solution is not, for the purposes of this invention, thermodynamically critical. However, for practical operation it is highly recommended that each ABA polymer be added to the organic liquid and dispersed therein before adding the gelation agent. Uniform distribution of each copolymer and gelation agent in the organic liquid occurs, due to the kinetics involved, in a reasonably short time when each ABA polymer is added to the organic liquid prior to the gelation agent.

Any convenient means of mixing the copolymeric component to achieve such as organic liquid-copolymer solution may be employed. Exemplary techniques include adding the copolymers in a solution miscible with the the polar organic liquid to be thickened.

The property characteristics of each triblock polymer will depend upon the combined effects of the nature of the center block; the degree of polymerization of the center block; and the mole ratio of the center block to the end blocks.

According to this invention, the polymeric end, or A, blocks must be poly(4-vinylpyridine). The solubility parameter of poly(4-vinylpyridine) is about 10.5. In general, suitable monomers are those which may be polymerized to form center, or B, block having a solubility parameter such that the ABA triblock polymer dissolves in the organic liquid. Consequently, the solubility parameter of the B block should be between about 7.5 to about 10.5.

The B block comprises a polymer having a solubility parameter such that each ABA block polymer dissolves in the organic liquid.

Exemplary monomers utilized to prepare the B blocks are any of the styrenics and the dienes. Specifically, the monomers may be selected from the group consisting of t-butylstyrene (s.p. 8.1), styrene (s.p. 9.3), α-methylstyrene (s.p. 8.5), vinyltoluene (s.p. 9.1), butadiene (s.p. 7.1), isoprene (s.p. 7.4) and the like. The particularly preferred monomer is t-butylstyrene.

Although not critical to the practice of this invention, good results are generally obtained when the center block of each triblock polymer has a moderate degree of polymerization (DP), which is the number of monomer units in an average polymer molecule in a given sample. To avoid processing problems such as shear degradation of the gelled liquid, the DP of each of the center blocks will preferably be from about 2,000 to about 15,000. Most preferably, the degree of polymerization of the center block will be from about 4,000 to about 6,000.

The copolymeric mole ratio will generally be between about 20 to about 100 moles of monomer in the center block per mole of monomer in the end blocks. Preferably, the mole ratio will be between about 30 and about 50 moles of monomer in the center block per mole of the end blocks. If the mole ratio is greater than about 100, it is believed that there may be too little 4-vinylpyridine in the solution to cause effective gelation; copolymers with a mole ratio less than about 20 are generally found to be rather insoluble in many organic liquids.

Each triblock polymer is prepared by anionic polymerization. Anionic polymerization is well-known in the art. *The Kirk-Othmer Encyclopedia of Chemical Technology*, 3rd edition, (1980), sets forth a general description of the method. Such polymerization may be carried out through the conventional solution polymerization procedures.

Each copolymer is generally made up from monomers in solution with a solvent that is suitable for anionic polymerization. To be suitable for anionic polymerization, the solvent has generally no active protons, carbonyl groups, or halogens. For example, suitable solvents include aliphatic hydrocarbons (e.g., hexane); aromatic hydrocarbons (e.g., benzene); cycloaliphatic (e.g., cyclohexane); and ethers (e.g., glyme and tetrahydrofuran).

The metal cations suitable for the purpose of this invention are commonly defined as members of the transition elements (See Chemical Text: "Chemical Principles and Properties" by M. J. Sienko and R. A. Plane, McGraw Hill Book Co., 1974, Page 19). Preferred transition metals include palladium, iron, cobalt, and copper, with palladium being the most preferred.

The quantity of the gelation agent employed has a pronounced influence on the thickening that is achieve, i.e., increase in gelation of the organic liquid-copolymer solution. By "effective amount" of gelation agent is meant that concentration of gelation agent is sufficient to achieve visible gelation of the solution.

When the gelation agent is a metal ion, the concentration of metal ion is based on the total number of metal cations relative to the total number of vinylpyridene moieties on the polymer chains in the organic liquid. Generally, the concentration of metal cations will be from between about 25 moles to about 75 moles of metal cation per 100 moles of 4-vinylpyridene moieties, preferably from between about 30 moles to about 60 moles of metal cation per 100 moles of 4-vinylpyridene moieties. A maximum thickening effect is accomplished when the concentration of metal cations is about 50 moles of metal cation per 100 moles of 4-vinylpyridene moieties. Above a ratio of about 75 moles of metal cation per 100 moles of 4-vinylpyridene moieties, the invention is still operative but the thickening effect is not substantially better than the maximum effect obtainable at the specified lower concentrations. The valence state of the metal may also be an important factor.

When the gelation agent is an acid, the concentration of acid is based on the total number of moles of acid relative to the total number of moles of vinylpyridene moieties in the polyer chains. Generally, the acid will be present in an amount from about 35 moles of acid to about 65 moles of acid per 100 moles of 4-vinylpyridene moieties. A maximum thickening effect is accomplished when the concentration of acid is about 50 moles of acid per 100 moles of 4-vinylpyridene moieties. Above about 65 moles of acid per 100 moles of 4-vinylpyridene moieties, the composition of this invention is still operative, but the thickening effect is not substantially better than the maximum effect obtainable at the specified lower concentrations.

As stated above, the gelation agent should be added to the organic liquid after the copolymers to hasten uniform gelation. The gelation agent may be added to the organic liquid directly, although, due to the kinetics involved, pronounced clumping occurs and uniform gelation is substantially slowed. Therefore, for practical operations the gelation agent is preferably taken up in solvent solution, and preferably the gelation agent solution added to the organic liquid-copolymer solution.

When the gelation agent is a transition metal ion, the transition metal ion should be made up, then, in solution in a solvent which will dissolve in the organic, liquid.

Preferably, the gelation agent will be prepared in solution with a solvent which has a very high solubility parameter; i.e., about 10; and/or which is very polar. Exemplary of solvents with solubility parameters above 10 are amides (e.g., dimethyl formamide); alcohols (methyl alcohol, and ethylene glycol); amines (e.g., ethyl amine); ethers (e.g., 1,4-dioxane); and aromatic heterocycles (e.g., pyridine). Exemplary polar solvents include tetrahydrofuran and methylene chloride. The most preferred solvent is dimethyl formamide (DMF).

When the gelatin agent employed is an acid the solvent will preferably be polar. Moreover, the solvent used in preparing the acid should be substantially nonaqueous. Although not intended to be bound by theory, it is believed that any water which may be present in the system will compete with the acid for protonation sides on the vinylpyridine moieties. Exemplary of suitable polar solvents include, in anhydrous form, amides (e.g., dimethyl formamide); alcohols (methyl alcohol, and ethylene glycol); amines (e.g., ethyl amine), esters (e.g., 1,4-dioxane); and aromatic heterocycles (e.g., pyridine). The most preferred solvent is dimethyl formamide (DMF).

Beneficially, a characteristic of gelled solutions of this invention is that of having relatively stable viscosities. Generally, the viscosity will not be reduced over relatively long time periods. The behavior of the gelled solution relative to shear, i.e., whether the solution will be shear-thickening or shear-thinning, will depend upon the specific organic liquid, the triblock polymers, and gelation agent employed. The viscosity of the gelled solution is not substantially affected when the temperature is varied from between about 25° C. and 70° C. In conventional concentrated organic liquid-copolymer solutions, the viscosity drops significantly with increasing temperature.

The present invention is further illustrated, but not limited, by the following examples. All parts and percentages are by weight.

EXAMPLES

EXAMPLE 1

An ABA copolymer solution, having A blocks of 4-vinylpyridene (4-VP) and a B block of t-butylstyrene (t-BS) is prepared. The degree of polymerization of each of the center blocks is about 2280. The mole ratio of tBS/VP is 96.5.

The triblock polymer solution is added to o-dichlorobenzene, an organic liquid with a solubility parameter of 10.04, in such a quantity to prepare an organic liquid-copolymer solution having about 1 percent copolymer based on the volume of the liquid. Enough solution by volume is weighed into small vials to provide 1.5-gram portions of said solution.

Solutions each containing about one percent of a transition metal, with the exception of technetium (Tc), based on the volume of the liquid are prepared in DMF. In each of a series of tests three drops of the metal salt solution is added to a polymer solution. The copolymer solution in each case is warmed in a steam bath to assure complete dissolution of the salt and uniform distribution of the gel.

The solutions are allowed to cool and checked for the extent of gelation.

Results of the Example 1 are summarized in Table 1.

TABLE 1

Extent of gelation of o-diClBz with Various 1% (w/v) ABA Triblock Polymer-Transition Metal Salt Combinations

| Metal Ion | $ScCl_3.6H_2O$ | $TiCl_3$ | $VCl_3$ | $CrCl_3.6H_2O$ | $MnCl_2.4H_2O$ |
|---|---|---|---|---|---|
| Gel State | NE | FLW | sFLW | NE | sFLW |
| Metal Ion | $Y(NO_3)_2.6H_2O$ | $ZrCl_4$ | $NbCl_5$ | $MoCl_5$ | Tc |
| Gel State | | FLW | FLW | FLP | |
| Metal Ion | $LaCl_3.6H_2O$ | $HfCl_4$ | $TaCl_5$ | $WCl_6$ | $ReCl_3$ |
| Gel State | NE | FLP | FLP | FLW | FLP |
| Metal Ion | $FeCl_3.6H_2O$ | $CoCl_3.6H_2O$ | $NiCl_3.6H_2O$ | $CuCl_3.2H_2O$ | $Zn(OAc)_2.2H_2O$ |
| Gel State | sFLW | sFLW | sFLW | FLW | NE |
| Metal Ion | $RuCl_3.3H_2O$ | $RhCl_5.3H_2O$ | $PdCl_2$ | $AgNO_3$ | $Cd(NO_3)_2.4H_2O$ |
| Gel State | sFLW | sFLW | STF | FLW | FLW |
| Metal Ion | $OsCl_3$ | $IrCl_3.3H_2O$ | $PtCl_2$ | $AuCl_3.6H_2O$ | $HgCl_2$ |
| Gel State | sFLP | NE | sFLW | NE | sFLW |

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 2

The procedures of Example 1 are followed with the exception that the degree of polymerization of each of the center blocks is about 5200 and the mole ratio to tBS/VP is 23.3.

Results of the Example 2 are summarized in Table 2.

TABLE 2

Extent of gelation of o-diClBz with Various 1% (w/v) ABA Triblock Polymer-Transition Metal Salt Combinations

| Metal Ion | $ScCl_3.6H_2O$ | $TiCl_3$ | $VCl_3$ | $CrCl_3.6H_2O$ | $MnCl_2.4H_2O$ |
|---|---|---|---|---|---|
| Gel State | sFLP | sFLP | sFLP | sFLP | sFLP |
| Metal Ion | $Y(NO_3)_2.6H_2$ | $ZrCl_4$ | $NbCl_5$ | $MoCl_5$ | Tc |
| Gel State | sFLW | sFLP | sFLP | FLP | |
| Metal Ion | $LaCl_3.6H_2O$ | $HfCl_4$ | $TaCl_5$ | $WCl_6$ | $ReCl_3$ |
| Gel State | sFLW | FLP | FLP | FLP | FLP |
| Metal Ion | $FeCl_3.6H_2O$ | $CoCl_3.6H_2O$ | $NiCl_3.6H_2O$ | $CuCl_3.2H_2O$ | $Zn(OAc)_2.2H_2O$ |

TABLE 2-continued

Extent of gelation of o-diClBz with Various 1% (w/v) ABA Triblock Polymer-Transition Metal Salt Combinations

| Gel State | sFLP | STF | FLP | FLP | FLP |
|---|---|---|---|---|---|
| Metal Ion | RuCl$_3$.3H$_2$O | RhCl$_5$.3H$_2$O | PdCl$_2$ | AgNO$_3$ | Cd(NO$_3$)$_2$.4H$_2$O |
| Gel State | FLW | STF | STF | FLW | FLP |
| Metal Ion | OsCl$_3$ | IrCl$_3$.3H$_2$O | PtCl$_2$ | AuCl$_3$.6H$_2$O | HgCl$_2$ |
| Gel State | FLP | FLW | FLW | FLW | FLP |

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 3

The procedures of Example 1 are followed with the exception that the degree of polymerization of each of the center blocks is about 9650 and the mole ratio of tBS/VP is 32.5.

Results of the Example 3 are summarized in Table 3.

TABLE 3

Extent of gelation of o-diClBz with Various 1% (w/v) ABA Triblock Polymer-Transition Metal Salt Combinations

| Metal Ion | ScCl$_3$.6H$_2$O | TiCl$_3$ | VCl$_3$ | CrCl$_3$.6H$_2$O | MnCl$_2$.4H$_2$O |
|---|---|---|---|---|---|
| Gel State | FLW | FLW | FLW | FLW | FLW |
| Metal Ion | Y(NO$_3$)$_2$.6H$_2$O | ZrCl$_4$ | NbCl$_5$ | MoCl$_5$ | Tc |
| Gel State | NE | FLW | FLW | FLW | |
| Metal Ion | LaCl$_3$.6H$_2$O | HfCl$_4$ | TaCl$_5$ | WCl$_6$ | ReCl$_3$ |
| Gel State | NE | sFLP | sFLP | FLW | sFLP |
| Metal Ion | FeCl$_3$.6H$_2$O | CoCl$_3$.6H$_2$O | NiCl$_3$.6H$_2$O | CuCl$_3$.2H$_2$O | Zn(OAc)$_2$.2H$_2$O |
| Gel State | FLW | sFLP | FLW | FLW | sFLP |
| Metal Ion | RuCl$_3$.3H$_2$O | RhCl$_5$.3H$_2$O | PdCl$_2$ | AgNO$_3$ | Cd(NO$_3$)$_2$.4H$_2$O |
| Gel State | sFLP | FLP | FLP | FLW | FLW |
| Metal Ion | OsCl$_3$ | IrCl$_3$.3H$_2$O | PtCl$_2$ | AuCl$_3$.6H$_2$O | HgCl$_2$ |
| Gel State | FLW | FLP | NE | FLW | sFLP |

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 4

The procedures of Example 1 are utilized with the following exceptions. The degree of polymerization of each of the center blocks is about 5190 and the mole ratio of tBS/VP is 60.3.

The ABA triblock polymer is added to ethylbenzene, an organic liquid with a solubility parameter of 8.81, in such a quantity to prepare a solution having about 1 percent copolymer based on the volume of the liquid.

Results of the Example 4 are summarized in Table 4.

TABLE 4

Extent of gelation of EB with Various 1% (w/v) ABA Triblock Polymer-Transition Metal Salt Combinations

| Metal Ion | ScCl$_3$.6H$_2$O | TiCl$_3$ | VCl$_3$ | CrCl$_3$.6H$_2$O | MnCl$_2$.4H$_2$O |
|---|---|---|---|---|---|
| Gel State | sFLW | FLW | FLW | FLW | FLW |
| Metal Ion | Y(NO$_3$)$_2$.6H$_2$O | ZrCl$_4$ | NbCl$_5$ | MoCl$_5$ | Tc |
| Gel State | NE | FLP | FLP | FLP | |
| Metal Ion | LaCl$_3$.6H$_2$O | HfCl$_4$ | TaCl$_5$ | WCl$_6$ | ReCl$_3$ |
| Gel State | NE | FLP | FLW | FLP | FLP |
| Metal Ion | FeCl$_3$.6H$_2$O | CoCl$_3$.6H$_2$O | NiCl$_3$.6H$_2$O | CuCl$_3$.2H$_2$O | Zn(OAc)$_2$.2H$_2$O |
| Gel State | STF | STF | FLP | FLW | FLW |
| Metal Ion | RuCl$_3$.3H$_2$O | RhCl$_5$.3H$_2$O | PdCl$_2$ | AgNO$_3$ | Cd(NO$_3$)$_2$.4H$_2$O |
| Gel State | FLP | FLW | FLP | FLW | FLP |
| Metal Ion | OsCl$_3$ | IrCl$_3$.3H$_2$O | PtCl$_2$ | AuCl$_3$.6H$_2$O | HgCl$_2$ |
| Gel State | FLW | FLP | FLW | sFLW | FLW |

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 5

The procedures of Example 2 are followed with the exception that the ABA triblock polymer is added to tetrahydrofuran, an organic liquid with a solubility parameter of 9.32, in such a quantity to prepare a solution having about 1 percent copolymer based on the volume of the liquid.

Results of the Example 5 are summarized in Table 5.

TABLE 5

Extent of gelation of THF with Various 1% (w/v) ABA Triblock Polymer-Transition Metal Salt Combinations

| Metal Ion | $ScCl_3.6H_2O$ | $TiCl_3$ | $VCl_3$ | $CrCl_3.6H_2O$ | $MnCl_2.4H_2O$ |
|---|---|---|---|---|---|
| Gel State | sFLW | STF | FLP | FLP | FLP |
| Metal Ion | $Y(NO_3)_2.6H_2O$ | $ZrCl_4$ | $NbCl_5$ | $MoCl_5$ | Tc |
| Gel State | NE | STF | STF | FLP | |
| Metal Ion | $LaCl_3.6H_2O$ | $HfCl_4$ | $TaCl_5$ | $WCl_6$ | $ReCl_3$ |
| Gel State | sFLW | STF | STF | sFLP | STF |
| Metal Ion | $FeCl_3.6H_2O$ | $CoCl_3.6H_2O$ | $NiCl_3.6H_2O$ | $CuCl_3.2H_2O$ | $Zn(OAc)_2.2H_2O$ |
| Gel State | FLP | FLP | FLP | STF | sFLP |
| Metal Ion | $RuCl_3.3H_2O$ | $RhCl_5.3H_2O$ | $PdCl_2$ | $AgNO_3$ | $Cd(NO_3)_2.4H_2O$ |
| Gel State | STF | STF | STF | FLW | FLP |
| Metal Ion | $OsCl_3$ | $IrCl_3.3H_2O$ | $PtCl_2$ | $AuCl_3.6H_2O$ | $HgCl_2$ |
| Gel State | STF | sFLW | STF | sFLW | sFLW |

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 6

The procedures of Example 4 are followed with the exception that the ABA triblock polymer is added to methylchloroform, an organic liquid with a solubility parameter of 8.50, in such a quantity to prepare a solution having about 1 percent copolymer based on the volume of the liquid.

Results of the Example 6 are summarized in Table 6.

TABLE 6

Extent of gelation of $MeCCl_3$ with Various 1% (w/v) ABA Triblock Polymer-Transition Metal Salt Combinations

| Metal Ion | $ScCl_3.6H_2O$ | $TiCl_3$ | $VCl_3$ | $CrCl_3.6H_2O$ | $MnCl_2.4H_2O$ |
|---|---|---|---|---|---|
| Gel State | sFLW | FLW | FLP | sFLP | sFLP |
| Metal Ion | $Y(NO_3)_2.6H_2O$ | $ZrCl_4$ | $NbCl_5$ | $MoCl_5$ | Tc |
| Gel State | NE | FLP | FLW | FLW | |
| Metal Ion | $LaCl_3.6H_2O$ | $HfCl_4$ | $TaCl_5$ | $WCl_6$ | $ReCl_3$ |
| Gel State | NE | FLW | sFLP | STF | FLP |
| Metal Ion | $FeCl_3.6H_2O$ | $CoCl_3.6H_2O$ | $NiCl_3.6H_2O$ | $CuCl_3.2H_2O$ | $Zn(OAc)_2.2H_2O$ |
| Gel State | STF | sFLP | sFLP | FLP | sFLW |
| Metal Ion | $RuCl_3.3H_2O$ | $RhCl_5.3H_2O$ | $PdCl_2$ | $AgNO_3$ | $Cd(NO_3)_2.4H_2O$ |
| Gel State | FLP | FLW | FLP | FLW | sFLP |
| Metal Ion | $OsCl_3$ | $IrCl_3.3H_2O$ | $PtCl_2$ | $AuCl_3.6H_2O$ | $HgCl_2$ |
| Gel State | FLP | sFLP | sFLW | sFLW | sFLP |

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 7

The procedures of Example 1 are utilized with the following exceptions. The degree of polymerization of the each of the center blocks is about 9230 and the mole ratio of tBS/VP is 66.9.

The ABA triblock polymer is added to glyme, an organic liquid with a solubility parameter of 8.6, in such a quantity to prepare a solution having about 1 percent copolymer based on the volume of the liquid.

Results of the Example 7 are summarized in Table 7.

TABLE 7

Extent of gelation of Glyme with Various 1% (w/v) ABA Triblock Polymer-Transition Metal Salt Combinations

| Metal Ion | $ScCl_3.6H_2O$ | $TiCl_3$ | $VCl_3$ | $CrCl_3.6H_2O$ | $MnCl_2.4H_2O$ |
|---|---|---|---|---|---|
| Gel State | FLW | FLW | FLW | FLP | FLW |
| Metal Ion | $Y(NO_3)_2.6H_2O$ | $ZrCl_4$ | $NbCl_5$ | $MoCl_5$ | Tc |
| Gel State | NE | FLW | FLW | FLW | |
| Metal Ion | $LaCl_3.6H_2O$ | $HfCl_4$ | $TaCl_5$ | $WCl_6$ | $ReCl_3$ |
| Gel State | FLW | sFLP | FLW | FLW | FLW |
| Metal Ion | $FeCl_3.6H_2O$ | $CoCl_3.6H_2O$ | $NiCl_3.6H_2O$ | $CuCl_3.2H_2O$ | $Zn(OAc)_2.2H_2O$ |
| Gel State | FLP | sFLP | FLW | FLW | sFLP |
| Metal Ion | $RuCl_3.3H_2O$ | $RhCl_5.3H_2O$ | $PdCl_2$ | $AgNO_3$ | $Cd(NO_3)_2.4H_2O$ |
| Gel State | FLP | FLP | sFLP | FLW | FLW |
| Metal Ion | $OsCl_3$ | $IrCl_3.3H_2O$ | $PtCl_2$ | $AuCl_3.6H_2O$ | $HgCl_2$ |

TABLE 7-continued

Extent of gelation of Glyme with Various 1% (w/v) ABA Triblock Polymer-Transition Metal Salt Combinations

| Gel State | FLW | FLW | FLP | NE | FLW |
|---|---|---|---|---|---|

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 8

The procedures of Example 1 are utilized with the following exceptions. The degree of polymerization of each of the center blocks is about 15,860 and the mole ratio of tBS/VP is 97.9.

The ABA triblock polymer is added to ethyl benzoate, an organic liquid with a solubility parameter of 9.75, in such a quantity to prepare a solution having about 1 percent copolymer based on the volume of the liquid.

Results of the Example 8 are summarized in Table 8.

TABLE 8

Extent of gelation of EtOOCΦ with Various 1% (w/v) ABA Triblock Polymer-Transition Metal Salt Combinations

| Metal Ion | $ScCl_3.6H_2O$ | $TiCl_3$ | $VCl_3$ | $CrCl_3.6H_2O$ | $MnCl_2.4H_2O$ |
|---|---|---|---|---|---|
| Gel State | sFLW | sFLP | FLW | FLW | sFLP |
| Metal Ion | $Y(NO_3)_2.6H_2O$ | $ZrCl_4$ | $NbCl_5$ | $MoCl_5$ | Tc |
| Gel State | NE | sFLP | FLW | FLW | |
| Metal Ion | $LaCl_3.6H_2O$ | $HfCl_4$ | $TaCl_5$ | $WCl_6$ | $ReCl_3$ |
| Gel State | | sFLP | FLW | FLW | FLW |
| Metal Ion | $FeCl_3.6H_2O$ | $CoCl_3.6H_2O$ | $NiCl_3.6H_2O$ | $CuCl_3.2H_2O$ | $Zn(OAc)_2.2H_2O$ |
| Gel State | FLW | FLW | sFLP | sFLP | sFLW |
| Metal Ion | $RuCl_3.3H_2O$ | $RhCl_5.3H_2O$ | $PdCl_2$ | $AgNO_3$ | $Cd(NO_3)_2.4H_2O$ |
| Gel State | FLW | sFLP | sSTF | FLW | FLW |
| Metal Ion | $OsCl_3$ | $IrCl_3.3H_2O$ | $PtCl_2$ | $AuCl_3.6H_2O$ | $HgCl_2$ |
| Gel State | FLW | FLW | sFLW | sFLW | FLW |

Gelation is rated as follows:
NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 9

An ABA copolymer solution, having A blocks of 4-vinylpyridene and a B block of t-butylstyrene is prepared. The degree of polymerization of each center block is about 9230. The mole ratio of tBS/VP is 66.9.

The triblock polymer solution is added to methyl i-butyl ketone (solubility parameter of 8.58) in such a quantity to prepare an organic liquid-copolymer solution having about 1 percent copolymer based on the volume of the liquid. One-gram portions of the solution are weighed into small vials.

A first acid solution is prepared by admixing 4.47 grams of p-toluene sulfonic acid.$H_2O$ in 100 ml of dimethyl formamide (DMF). The acid solution has a strength of $2.35 \times 10^{-4}$ mmol/$\mu$l.

A second acid solution is prepared by bubbling gaseous HCl into 100 ml of dimethyl formamide (DMF) until an acid solution having a strength of $2.92 \times 10^{-4}$ mmol/$\mu$l is obtained.

A third acid solution of anhydrous $H_3PO_4$ is prepared by admixing 1.0 gram of anhydrous $H_3PO_4$ in 50 ml of dimethyl formamide (DMF). The acid solution has a strength of $2.04 \times 10^{-4}$ mmol/$\mu$l.

A fourth acid solution of anhydrous oxalic acid is prepared by admixing 1.0 gram of anhydrous oxalic acid in 50 ml of dimethyl formamide (DMF). The acid solution has a strength of $2.22 \times 10^{-4}$ mmol/$\mu$l.

The 1.0-gram portions of the copolymer solution are admixed with 5 $\mu$l of the several different types of acids. Each portion is warmed in a steam bath to assure complete dissolution of the acid and uniform distribution of the gel. In each instance, the solutions are allowed to cool and checked for the extent of gelation.

Results of the Example 9 are set forth in Table 9.

EXAMPLE 10

The procedures of Example 1 are followed with the exception that the ABA triblock copolymer is added to methylchloroform (solubility parameter of 8.50) in such a quantity to prepare a copolymer solution having about 2 percent copolymer based on the volume of the liquid.

The 1.0-gram portions of the copolymer solution are admixed with 10 $\mu$l of the several different types of acids.

Results of the Example 10 are set forth in Table 9.

EXAMPLE 11

The procedures of Example 1 are followed with the exception that the ABA copolymer is added to tetrahydrofuran (solubility parameter of 9.32) in such a quantity to prepare a solution having about 0.5 percent triblock polymer based on the volume of the liquid.

The 1.0-gram portions of the copolymer solution are admixed with 5 $\mu$l of the several different types of acids.

Results of the Example 11 are set forth in Table 9.

EXAMPLE 12

The procedures of Example 1 are followed with the exception that the ABA triblock polymer is added to o-dichlorobenzene (solubility parameter of 10.04) in such a quantity to prepare a solution having about 5 percent triblock polymer based on the volume of the liquid.

The 1.0-gram portions of the copolymer solution are admixed with 50 μl of the several different types of acids.

Results of the Example 12 are set forth in Table 9.

TABLE 9

| Example | Solution | Vol Acid Solution | pTSA | HCl | H$_3$PO$_4$ | Oxalic |
|---|---|---|---|---|---|---|
| 9 | 1% MiBK | 5 μl | FLW | FLW | FLW | FLW |
| 10 | 2% MeCCl$_3$ | 10 μl | FLW | FLW | sFLW | STF |
| 11 | 0.5% THF | 5 μl | FLW | FLW | FLP | NE |
| 12 | 5% o-DCIB | 50 μl | STF | STF | STF | STF |

NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 13

The procedures of Example 1 are followed with the following exceptions: The ABA triblock polymer employed has a center block of t-butylstyrene with a degree of polymerization of about 15,860 and the mole ratio of tBS/VP is 97.9. The copolymer is added to glyme (solubility parameter of 8.6) in such a quantity to prepare a solution having about 1 percent copolymer based on the volume of the liquid.

The 1.0-gram portions of the copolymer solution are admixed with 5 μl of the several different types of acids.

Results of the Example 13 are set forth in Table 10.

EXAMPLE 14

The procedures of Example 5 are followed with the following exception: The copolymer is added to nonane (solubility parameter of 7.75) in such a quantity to prepare a solution having about 1 percent copolymer based on the volume of the liquid.

The 1.0-gram portions of the copolymer solution are admixed with 5 μl of the several different types of acids. Results of the Example 14 are set forth in Table 10.

EXAMPLE 15

The procedures of Example 6 are followed with the following exception: the 1.0-gram portions of the copolymer solution are admixed with 50 μl of the several different types of acids.

Results of the Example 15 are set forth in Table 10.

EXAMPLE 16

The procedures of Example 5 are followed with the following exception: The copolymer is added to tetrahydrofuran (solubility parameter of 9.32) in such a quantity to prepare a solution having about 3.2 percent copolymer based on the volume of the liquid.

The 1.0-gram portions of the polymer solution are admixed with 16 μl of the several different types of acids.

Results of the Example 16 are set forth in Table 10.

TABLE 10

| Example | Solution | Vol Acid Solution | pTSA | HCl | H$_3$PO$_4$ | Oxalic |
|---|---|---|---|---|---|---|
| 13 | 1% glyme | 5 μl | FLW | FLW | FLW | FLW |
| 14 | 1% C$_9$H$_{20}$ | 5 μl | η ↑ | η ↑ | NE | FLW |
| 15 | 1% C$_9$H$_{20}$ | 50 μl | η ↑ | sFLW | η ↑ | sFLW |
| 16 | 3.2% THF | 16 μl | STF | STF | STF | Rubbery |

NE (No Effect)
η ↑ - viscosity increased
FLW (Flowing gel) - The solution is completely filled with loose gels which flow freely.
Rubbery - an elastic gel formed.
FLP (Floppy Gel) - The gel holds together and flops back and forth in the vial.
STF (Stiff gel) - The gel does not move in the vial with light shaking.
The prefix "s" before a rating means "not quite as good".

EXAMPLE 17

The procedures of Example 1 are followed with the following exceptions: The ABA triblock polymer employed has a center block of t-butylstyrene with a degree of polymerization of about 5200 and the mole ratio of tBS/VP is 28.3. The copolymer is added to tetrahydrofuran (solubility parameter of 9.32) in such a quantity to prepare a solution having about 1 percent copolymer based on the volume of the liquid.

The 1.0-gram portions of the polymer solution are admixed with 5 μl of the several different types of acids.

Results of the Example 17 are set forth in Table 11.

EXAMPLE 18

The procedures of Example 9 are followed with the following exceptions: the copolymer is added to methyl i-butyl ketone (solubility parameter of 8.58) in such a quantity to prepare a solution having about 1 percent copolymer based on the volume of the liquid and the 1.0-gram portions of the polymer solution are admixed with 50 μl of the several different types of acids.

Results of the Example 18 are set forth in Table 11.

EXAMPLE 19

The procedures of Examples 1 are followed with the following exceptions: The ABA triblock polymer employed has a center block of styrene with a degree of polymerization of about 4080 and the mole ratio of tBS/VP is 31.0. The polymer is added to tetrahydrofuran (solubility parameter of 9.32) in such a quantity to prepare a solution having about 2 percent copolymer based on the volume of the liquid.

The 1.0-gram portions of the polymer solution are admixed with 100 μl of the several different types of acids.

Results of the Example 19 are set forth in Table 11.

TABLE 11

| Example | Solution | Vol Acid Solution | pTSA | HCl | H$_3$PO$_4$ | Oxalic |
|---|---|---|---|---|---|---|
| 17 | 1% THF | 5 μl | FLW | FLW | Discreet gels | NE |
| 18 | 1% MiBK | 50 μl | FLW | sFLW | FLW | FLW |
| 19 | 2% THF | 100 μl | STF | STF | STF | STF |

NE (No effect)
FLW (Flowing gel) - The solution is completely filled with loose gels which flow freely.
FLP (Floppy Gel) - The gel holds together and flops back and forth in the vial.
STF (Stiff gel) - The gel does not move in the vial with light shaking.
The prefix "s" before a rating means "not quite as good".

I claim:

1. A method for the gelation of organic liquids comprising:
(a) providing an organic liquid having a solubility parameter in the range of between about 7.5 to about 10.5;
(b) contacting the organic liquid with one or more types of ABA block polymer of moderate molecular weight, wherein the A block is 4-vinylpyridine and the B block consists of at least one polymer where the monomers used are any of the styrenics and/or dienes and has a degree of polymerization from about 2,000 to about 15,000 and having a solubility parameter of between about 7.5 and 10.5, such that each ABA block polymer dissolves in the organic liquid; and
(c) contacting the organic liquid with at least one gelation agent in an amount effective to cause visible gelation of the ABA triblock polymers in the organic liquid, said gelation agent being a transition metal salt or an acid.

2. The method of claim 1 wherein the organic liquid is selected from the group consisting of aliphatic hydocarbons, aromatic hydrocarbons, chlorinated solvents, ketones, esters and ethers.

3. The method of claim 2 wherein the aliphatic hydocarbon is nonane.

4. The method of claim 2 wherein the aromatic hydrocarbon is ethylbenzene.

5. The method of claim 2 wherein the chlorinated solvent is selected from the group consisting of methylchloroform and o-dichlorobenzene.

6. The method of claim 2 wherein the ketone is methyl i-butyl ketone.

7. The method of claim 2 wherein the ester is ethyl benzoate.

8. The method of claim 2 wherein the ether is selected from the group consisting of glyme and tetrahydrofuran.

9. The method of claim 1, wherein the amount of triblock copolymer is present in an amount of from about 0.5 to about 5 weight percent, based on the resultant solution.

10. The method of claim 9, wherein the amount of triblock copolymer is present in an amount of from about 1 to about 2 weight percent, based on the resultant solution.

11. The method of claim 9, wherein the triblock copolymer has a molecular weight of from between about 200,000 to about 800,000.

12. The method of claim 1 wherein the B block is selected from the group consisting of styrenics and the dienes.

13. The method of claim 12 wherein the B block is selected from the group consisting of t-butylstyrene, styrene, α-methylstyrene, vinyltoluene, butadiene, isoprene.

14. The method of claim 1 wherein the DP of the ABA center block is from between about 2,000 to about 15,000.

15. The method of claim 1 wherein the DP of the ABA center block is from between about 4,000 to about 6,000.

16. The method of claim 1 wherein in the ABA triblock the mole ratio of monomer in the center block to the monomer in the end blocks is between about 20 to about 100.

17. The method of claim 16 wherein the ABA triblock the mole ratio of monomer in the center block to the monomer in the end blocks is between about 30 to about 50.

18. The method of claim 1 wherein the transition metal is selected from the group consisting of palladium, iron, cobalt, and copper.

19. The method of claim 1 wherein the concentration of metal cations relative to vinylpyridene moieties is from between about 25 to about 75 moles of metal cation per 100 moles of 4-vinylpyridene moieties.

20. The method of claim 19 wherein the concentration of metal cations relative to vinylpyridene moieties is from between about 30 to about 60 moles of metal cation per 100 moles of 4-vinylpyridene moieties.

21. The method of claim 1 wherein the acid has a dissociation constant ($pK_a$) of about 3 or less.

22. The method of claim 1 wherein the acid is selected from the group of monobasic and polybasic acids.

23. The method of claim 1 wherein the acid is inorganic.

24. The method of claim 23 wherein the inorganic acid is selected from the group consisting of phosphoric acid, pyrophosphoric acid, sulfuric acid, HCl, HBr, iodic acid, and chromic acid.

25. The method of claim 1 wherein the acid is organic.

26. The method of claim 25 wherein the organic acid is selected from the group consisting of oxalic acid, o-phthalic acid, malonic acid, chloroacetic acid, dichloroacetic acid, bromoacetic acid, and dibromoacetic acid, p-toluene sulfonic acid.

27. The method of claim 1 wherein the concentration of acid relative to vinylpyridene moieties is from between about 35 moles to about 65 moles of acid per 100 moles of 4-vinylpyridene moieties.

28. The method of claim 27 wherein the concentration of acid relative to vinylpyridene moieties is about 50 moles of acid per 100 moles of 4-vinylpyridene moieties.

29. A composition comprising a gelled organic liquid comprising:
(a) an organic liquid having a solubility parameter in the range of between about 7.5 to about 10.5;
(b) one or more types of ABA block polymer of moderate molecular weight, wherein the A block is 4-vinylpyridine and the B block consists of at least one polymer where the monomers used are any of the styrenics and/or dienes and has a degree of polymerization from about 2,000 to about 15,000 and having a solubility parameter of between about 7.5 and 10.5, such that each ABA block polymer dissolves in the organic liquid; and
(c) at least one gelation agent in an amount sufficient to form a visible gel, said gelation agent being a transition metal salt or an acid.

30. The composition of claim 29 wherein the organic liquid is selected from the group consisting of aliphatic hydocarbons, aromatic hydrocarbons, chlorinated solvents, ketones, esters and ethers.

31. The composition of claim 30 wherein the aliphatic hydocarbon is nonane.

32. The composition of claim 30 wherein the aromatic hydrocarbon is ethylbenzene.

33. The composition of claim 30 wherein the chlorinated solvent is selected from the group consisting of methylchloroform and o-dichlorobenzene.

34. The composition of claim 30 wherein the ketone is methyl i-butyl ketone.

35. The composition of claim 30 wherein the ester is ethyl benzoate.

36. The composition of claim 30 wherein the ether is selected from the group consisting of glyme and tetrahydrofuran.

37. The composition of claim 29, wherein the amount of triblock copolymer is present in an amount of from about 0.5 to about 5 weight percent, based on the resultant solution.

38. The composition of claim 37, wherein the amount of triblock copolymer is present in an amount of from about 1 to about 2 weight percent, based on the resultant solution.

39. The composition of claim 37, wherein the triblock copolymer has a molecular weight of from between about 200,000 to about 800,000.

40. The composition of claim 29 wherein the B block is selected from the group consisting of styrenics and the dienes.

41. The composition of claim 40 wherein the B block is selected from the group consisting of t-butylstyrene, styrene, α-methylstyrene, vinyltoluene, butadiene, isoprene.

42. The composition of claim 29 wherein the DP of the ABA center block is from between about 2,000 to about 15,000.

43. The composition of claim 29 wherein the DP of the ABA center block is from between about 4,000 to about 6,000.

44. The composition of claim 29 wherein in the ABA triblock the mole ratio of monomer in the center block to monomer in the end blocks is between about 20 to about 100.

45. The composition of claim 44 wherein the ABA triblock the mole ratio of monomer in the center block to monomer in the end blocks is between about 30 mole percent to about 50 mole percent.

46. The composition of claim 29 wherein the transition metal is selected from the group consisting of palladium, iron, cobalt, and copper.

47. The composition of claim 29 wherein the concentration of transition metal cations relative to vinylpyridene moieties is from between about 25 to about 75 moles of metal cation per 100 moles of 4-vinylpyridene moieties.

48. The composition of claim 47 wherein the concentration of transition metal cations relative to vinylpyridine moieties is from between about 30 to about 60 moles of metal cation per 100 moles of 4-vinylpyridene moieties.

49. The composition of claim 29 wherein the acid has a dissociation constant ($pK_a$) of about 3 or less.

50. The composition of claim 29 wherein the acid is selected from the group of monobasic and polybasic acids.

51. The composition of claim 29 wherein the acid in inorganic.

52. The composition of claim 51 wherein the inorganic acid is selected from the group consisting of phosphoric acid, pyrophosphoric acid, sulfuric acid, HCl, HBr, iodic acid, and chromic acid.

53. The composition of claim 29 wherein the acid is organic.

54. The composition of claim 52 wherein the organic acid is selected from the group consisting of oxalic acid, o-phthalic acid, malonic acid, chloroacetic acid, dichloroacetic acid, bromoacetic acid, and dibromoacetic acid, p-toluene sulfonic acid.

55. The composition of claim 29 wherein the acid is present in an amount from about 35 moles to about 65 moles of acid per 100 moles of 4-vinylpyridine moieties.

56. The composition of claim 55 wherein the concentration of acid relative to vinylpyridene moieties is about 50 moles of acid per 100 moles of 4-vinylpyridine moieties.

* * * * *